(No Model.) 2 Sheets—Sheet 1.

P. J. KERN.
VEHICLE SPRING.

No. 432,880. Patented July 22, 1890.

WITNESSES:
Fred G. Dieterich
M. D. Blondel

INVENTOR:
P. J. Kern

BY Munn & Co.
ATTORNEYS (No Model.) 2 Sheets—Sheet 2.

P. J. KERN.
VEHICLE SPRING.

No. 432,880. Patented July 22, 1890.

WITNESSES
Fred G. Dieterich
M. D. Blondel

INVENTOR:
P. J. Kern.
BY
ATTORNEYS though, the operation, the operation of the springs, and the operation of the springs, and the operation of the springs, and the operation of the springs.

UNITED STATES PATENT OFFICE.

PHAON J. KERN, OF FRANKFORT, INDIANA.

VEHICLE-SPRING.

SPECIFICATION forming part of Letters Patent No. 432,880, dated July 22, 1890.

Application filed April 7, 1890. Serial No. 347,120. (No model.)

*To all whom it may concern:*

Be it known that I, PHAON J. KERN, residing at Frankfort, in the county of Clinton and State of Indiana, have invented certain new and useful Improvements in Vehicle-Springs, of which the following is a specification.

My invention relates more particularly to springs for road-carts; and it has for its object to provide a simple, cheap, and effective arrangement of springs for the purpose desired; and it consists in such novel arrangement and peculiar combination of parts as will be hereinafter fully described in the annexed specification, and particularly pointed out in the claims, reference being had to the accompanying drawings, in which—

Figure 1:
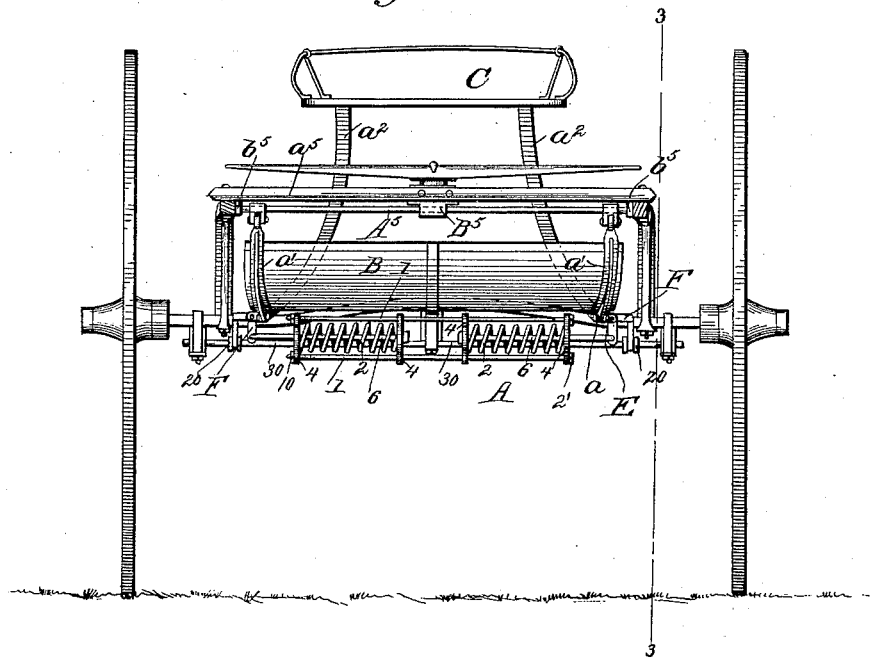
Figure 2:
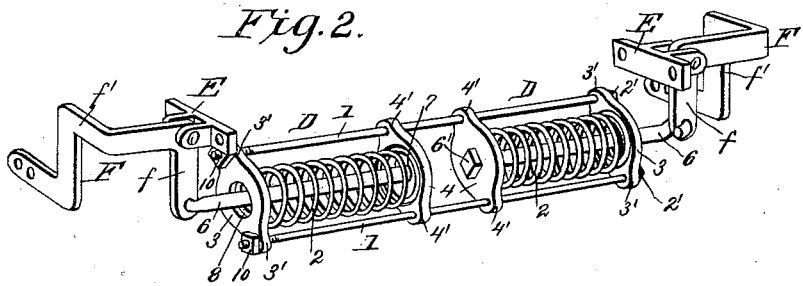
Figure 3:
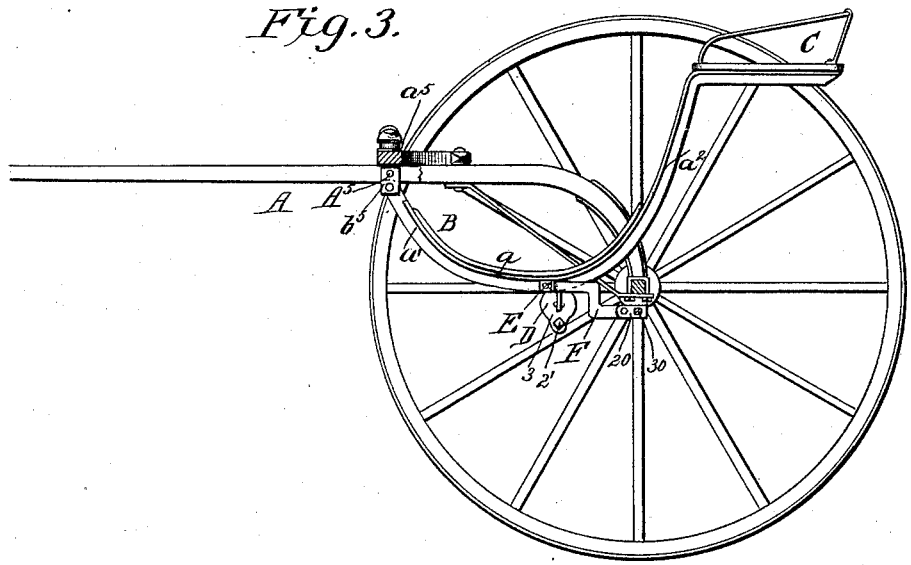
Figure 4:
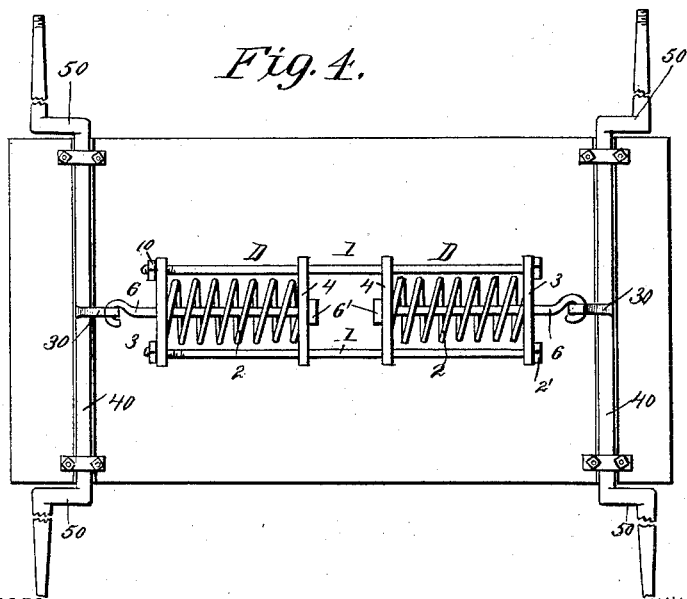

Figure 1 is a front view of my improvements as applied for use. Fig. 2 is a detail perspective view of the springs detached. Fig. 3 is a longitudinal section on the line 3 3, Fig. 1; and Fig. 4 is a view of a modification hereinafter referred to.

In the accompanying drawings, A indicates the road-cart, which in its general form may be of the ordinary construction, the bow-irons $a$ $a$ of which are connected at their forward ends to shackles held on a torsion spring-bar $A^5$, having a central fixed bearing $B^5$, secured upon the under side of the cross-bar $a^5$, its ends being loosely mounted in collars $b^5$ $b^5$, as shown, said bow-irons extended downward at $a'$, forming a support for the foot-rest B, and upward, as at $a^2$, to form a support for the seat C.

My improved arrangement of the springs D, which are most clearly shown in Fig. 2 of the drawings, consists in providing the two parallel rods 1 1, which are supported from and under the foot-rest B, which serve as guides to support the coiled springs 2 2, said springs being held in position between the fixed end socket-plates 3 3 and the intermediate sliding plates 4 4. Each of the plates 3 3 4 4 are formed with apertured ears 3' 3' and 4' 4', through which the rods 1 1 pass, said rods and the end plates 3 3 being held in a fixed relation with each other by providing one end of the rods with heads 2' 2' at one end and providing the opposite ends of such rods with screw-threaded portions adapted to receive the holding-nuts 10 10, as shown.

6 6 denote short rods provided with headed ends 6' 6', which pass through apertures 7 7 in the sliding plates 4 4 and through apertures 8 8 in the plates 3 3, such apertures being enlarged to admit of lateral play of the rods 6 6. About these rods and held between the plates 3 and 4 are disposed stout coiled springs, the tension of which may be readily adjusted by tightening or loosening the nuts 10 10.

E E denote the shackles secured to the bow-irons $a$ $a$, as shown, in which are pivoted the bell-crank levers F F, the short arms $f f$ of which are pivotally connected to the outer ends of the rods 6 6, while their long arms $f'$ $f'$ are extended rearward and downward and connected with swinging shackles or clips 20 20, secured upon a torsional spring-bar 30 30, held upon the under side of the rear axle, as shown.

From the foregoing description, taken in connection with the drawings, the operation and advantages of my invention will be readily understood.

It will be seen that the vertical swinging motion of the body will cause the bell-crank levers to rock, owing to their peculiar connection with the rear axle of the shafts, and that such vertical movement will exert a horizontal strain on the coil-springs 2, the rods 6 6 serving to pull the plates 4 4 outward to compress the said spring.

In Fig. 3 I have shown my invention as applied for use in connection with a buggy-body. In this arrangement the springs are disposed lengthwise under the buggy-bottom, and the rods 6 6, secured at their outer ends to lugs 30 30, extended inwardly from equalizing-bars 40 40, journaled transversely across the bottom of the buggy in suitable bearings secured to the sills, said bars having outward extensions 50 50, which are adapted to be connected to the running-gear by being hung to a semi-end spring or to a head-block and back axle. By this construction it will be observed that the jolting movement of the body or running-gear will cause the equalizing-bars to rock in their bearings and pull against the tension of the springs 2 2.

Having thus described my invention, what I claim, and desire to secure by Letters Patent, is—

1. The combination, with the supportingframe and the torsional spring-bars mounted therein, of the body portion pivotally hung at its forward end on the forward spring-bar, a bell-crank lever pivoted to said body portion and connected at one end to the rear torsional bar, tension-springs disposed transversely to the body and parallel with the torsional bars, and connections between said springs and the bell-crank levers, whereby the vertical movement of the body will exert tension thereon, substantially as and for the purpose described.

2. The combination, with the vehicle-frame, the bow-irons pivotally supported at their forward end on said frame, the body A, supported on said bow-irons, the shackles secured to the bow-irons, and the bell-crank levers journaled in said shackles, of the tension-spring devices D, held upon the lower portion of the body A, said spring devices consisting of the rods 1 1, the apertured fixed plates 3 3, secured thereto, the sliding plates 4 4, the coiled springs 2 2, disposed between the plates 3 3 4 4, and the rods 6 6, said rods secured at their inner ends to the plates 3 3, disposed within the springs 2 2, extended through the apertured plates 3 3 and connected to the short arm $f$ of the bell-crank levers F, and a connection between the long arm $f'$ of the levers F and the frame of the vehicle, substantially as and for the purpose described.

3. The combination, with the vehicle-frame, a torsional spring-bar $A^5$, transversely arranged between the shafts, and a vehicle-body hung at its forward end on said spring-bar, adapted for vertical movement in relation to the running-gear, of tension-springs disposed horizontally to such movement of the body, a torsional spring-bar 30, held upon the rear axle, and a connection between said tension-spring and the torsional spring-bar, whereby the vertical movement of such body will exert torsional strain on the spring-bar 30 and tensional strain on the coiled springs, substantially as and for the purpose described.

PHAON J. KERN.

Witnesses:
CHARLES M. LEISURE,
WILLIAM H. NEED.